United States Patent [19]

Shubert

[11] Patent Number: 4,601,833

[45] Date of Patent: Jul. 22, 1986

[54] DEVICE FOR REMOVING SEPARATED FLUIDS AND METHOD FOR USING SAME

[76] Inventor: Wesley M. Shubert, 1614 Pierce Circle, Ames, Iowa 50010

[21] Appl. No.: 736,952

[22] Filed: May 22, 1985

[51] Int. Cl.$^4$ ............................................. B01D 17/00
[52] U.S. Cl. .................................. 210/744; 210/104; 210/122; 210/242.1; 210/416.1
[58] Field of Search ............... 210/104, 110, 122, 121, 210/242.1, 242.3, 744, 416.1, 923

[56] References Cited

U.S. PATENT DOCUMENTS

| | | | |
|---|---|---|---|
| 1,450,545 | 4/1923 | Hans | 210/122 |
| 3,810,546 | 5/1974 | Oxenham | 210/242.3 |
| 4,154,678 | 5/1979 | Kole | 210/242.1 |

FOREIGN PATENT DOCUMENTS

| | | | |
|---|---|---|---|
| 2721108 | 11/1978 | Fed. Rep. of Germany | 210/242.3 |
| 1064975 | 1/1984 | U.S.S.R. | 210/121 |

*Primary Examiner*—Bernard Nozick
*Attorney, Agent, or Firm*—Zarley, McKee, Thomte, Voorhees & Sease

[57] ABSTRACT

The device of the present invention comprises a frame assembly having a trough frame and a float frame. The float frame includes a fluid removal device thereon with an inlet opening for taking in fluid in response to actuation of the removal device. The trough frame has a trough thereon. The float frame is movable with respect to the trough frame from a sealed position with the trough in sealed covering relation over the inlet opening of the removal device to an open position wherein the trough is spaced away from the inlet opening. The float frame has sufficient buoyancy to float at a predetermined level in the fluid with the inlet opening of the removal device positioned below the surface of the fluid. The method of the present invention involves lowering the frame assembly from an upper position wherein the float frame is in its sealed position and wherein the trough is above the fluid to a float position wherein the float frame is at its predetermined level in the fluid to a lower position wherein the float remains at its predetermined level in the fluid and the trough has moved downwardly to its open position relative to the float frame. In this position, the removal device is actuated to remove fluid from beneath the surface of the fluid reservoir.

14 Claims, 16 Drawing Figures

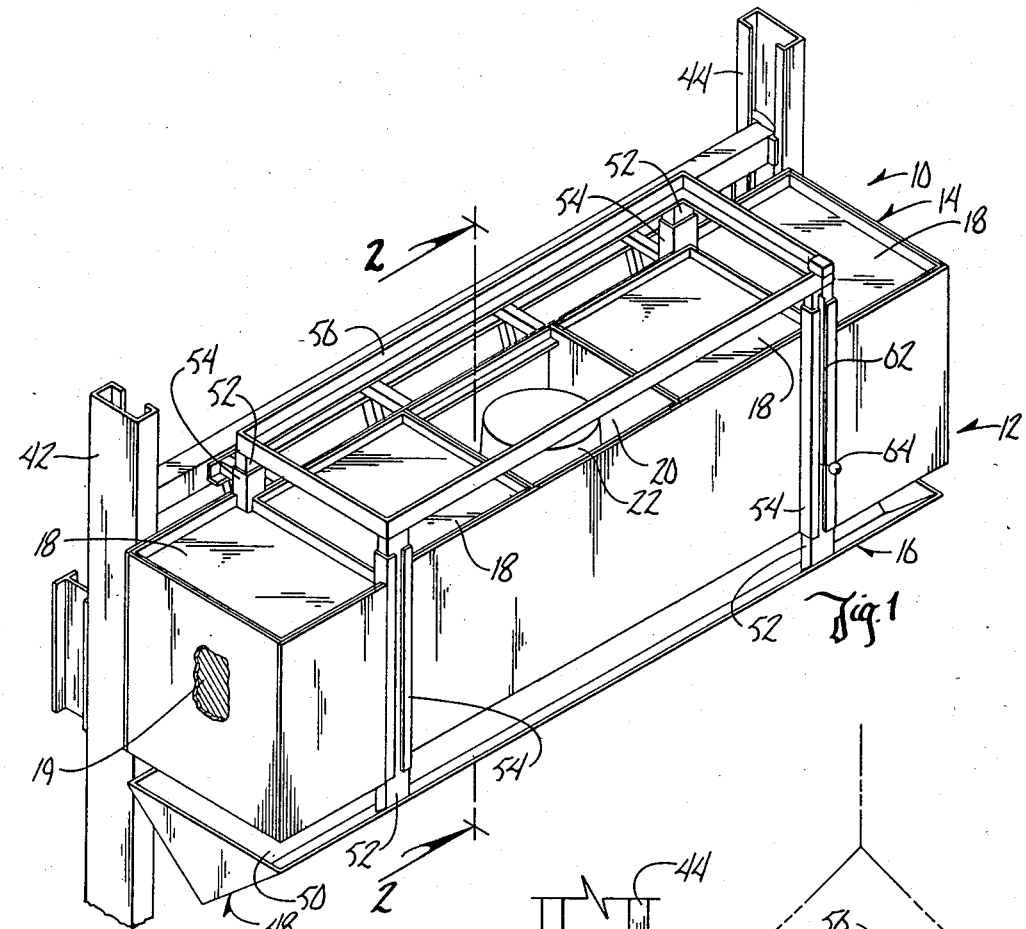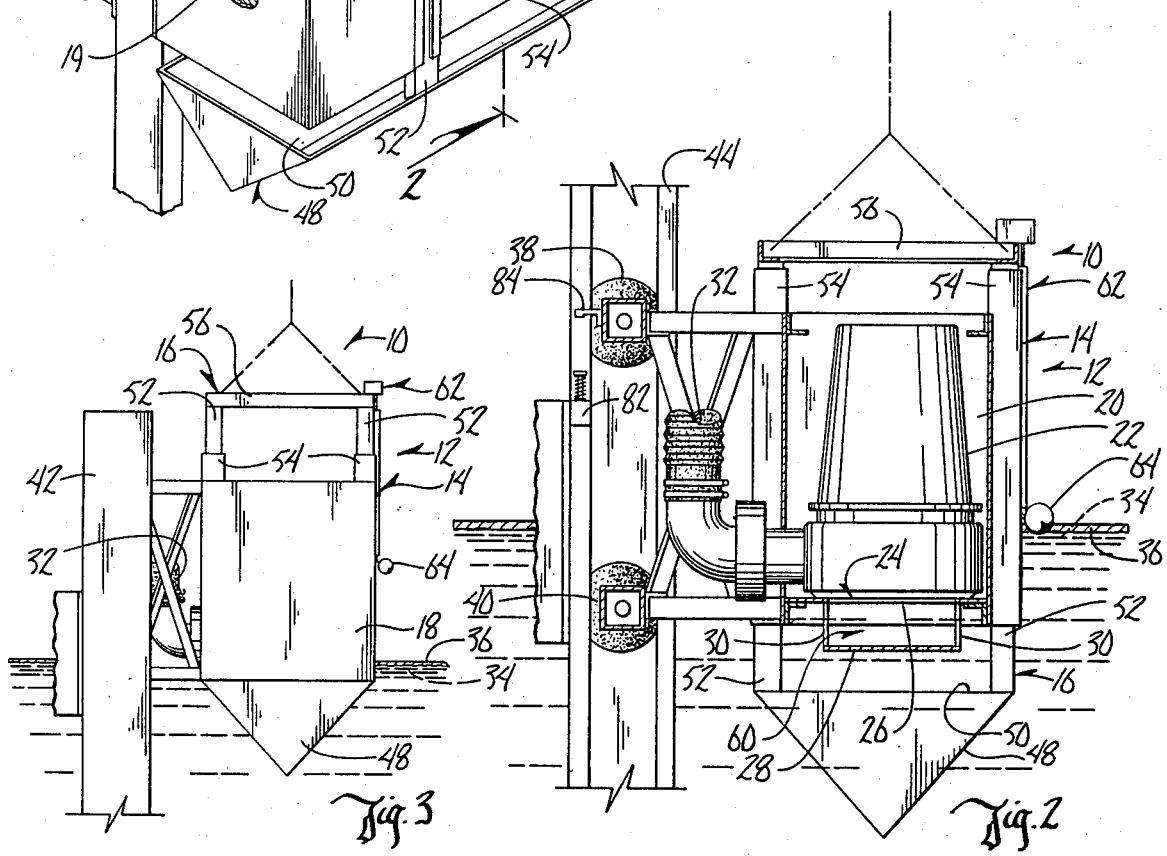

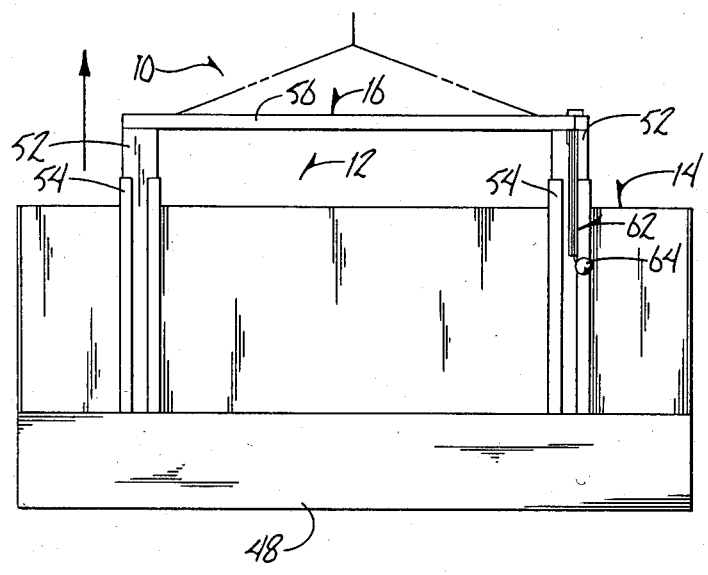
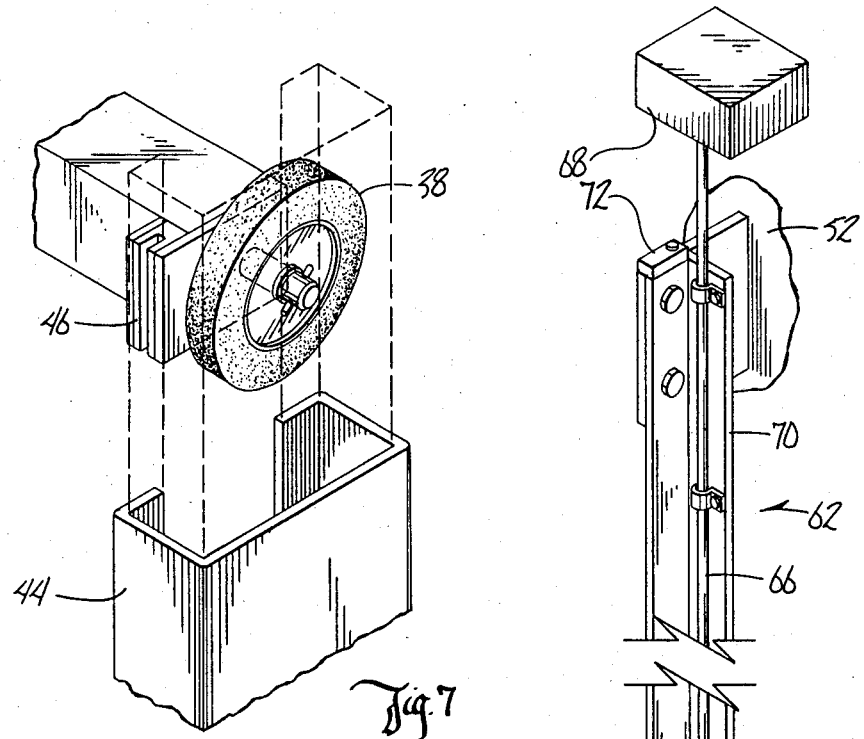
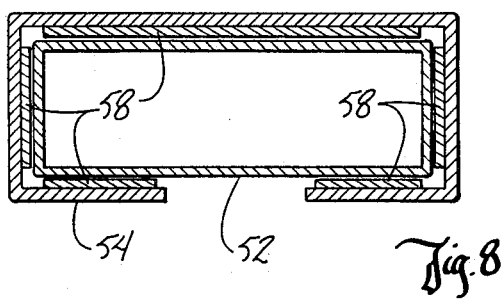
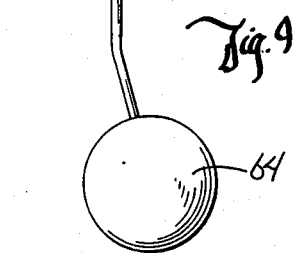

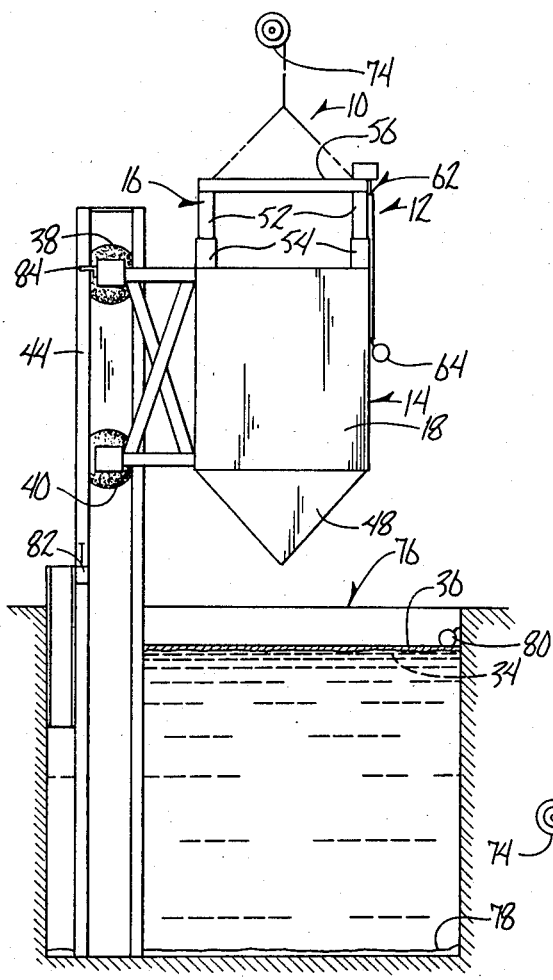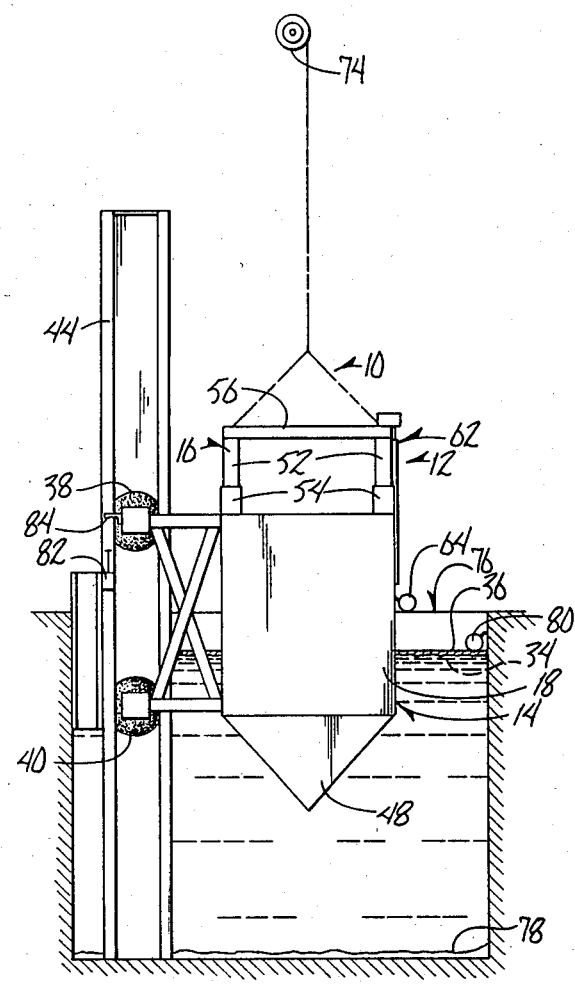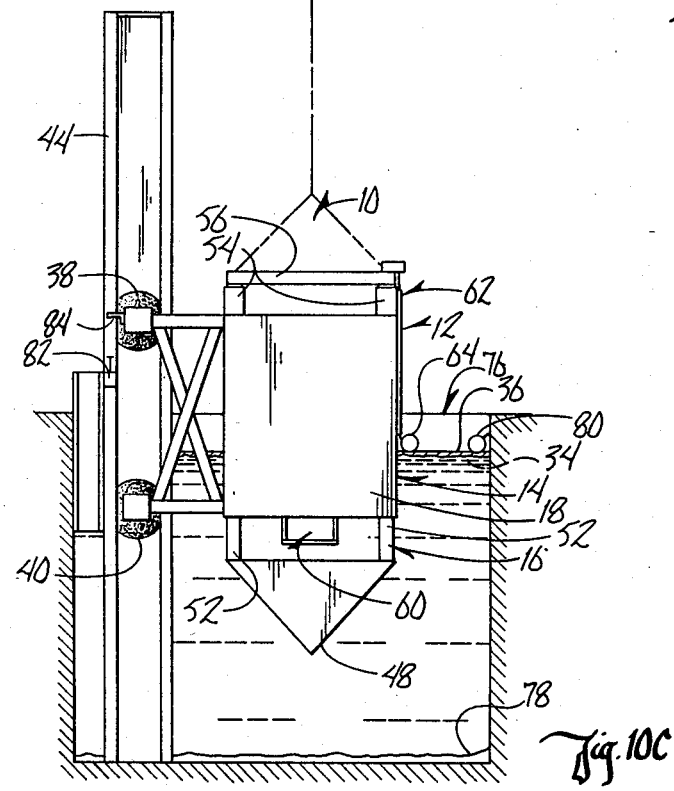

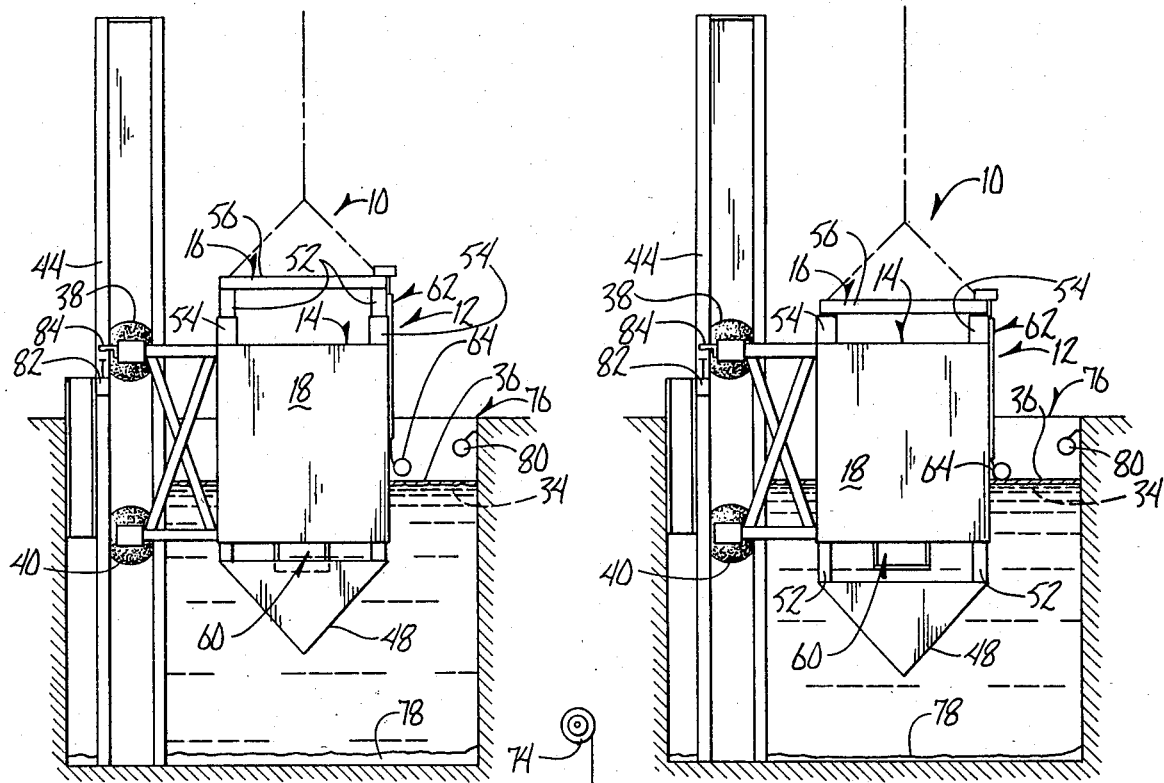
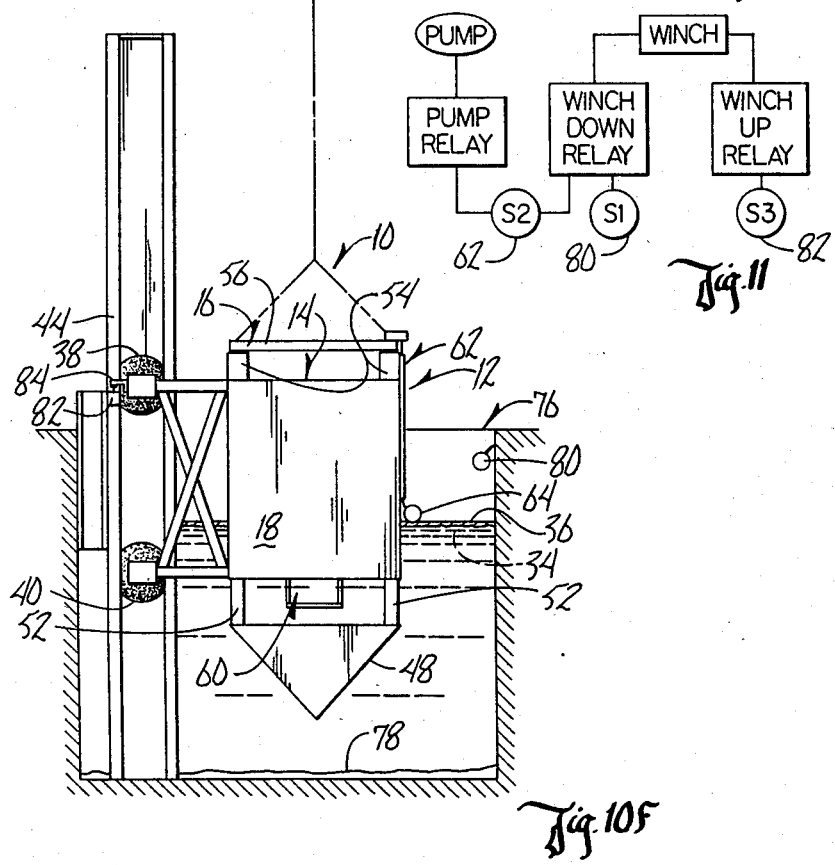

4,601,833

DEVICE FOR REMOVING SEPARATED FLUIDS AND METHOD FOR USING SAME

BACKGROUND OF THE INVENTION

This invention relates to a device for removing separated fluids in water and waste water systems and a method for using same.

Several problems are encountered with attempting to remove a specific separated fluid from a basin, tank or reservoir wherein the fluids are being kept. In such reservoirs, the fluid is usually covered with a crust or scum of partially decomposed solid materials. In addition, other solids settle to the bottom, and form a layer of solids. Therefore, it is desirable to remove fluid from an intermediate level within the reservoir which is below the crust or scum at the upper surface of the reservoir and which is above the solids which have settled to the bottom.

Attempts to remove fluid from either the upper level of the reservoir or the lower level of the reservoir, often result in clogging or constricting of the removal device, thereby hindering the efficiency of the operation, and occasionally resulting in malfunctioning of the device and/or equipment.

Therefore, a primary object of the present invention is the provision of an improved device for removing separated fluid and a method for using same.

A further object of the present invention is the provision of a device which permits the removal of fluid from a level in the reservoir which is below the upper surface of the reservoir and which is above the bottom of the reservoir.

A further object of the present invention is the provision of a device which permits the breaking or separating of the crust or scum which forms on the upper surface of the reservoir so that the device can be lowered to a level in the reservoir where clearer effluent may be located.

A further object of the present invention is the provision of a device which can be used to continue removing the fluid as the level of fluid in the reservoir drops, while at the same time continuing to remove fluid from a level below the upper crust of the reservoir.

A further object of the present invention is the provision of a device which draws water into the fluid removal device in a horizontal direction, thereby minimizing the picking up of solids from the bottom or beneath the device.

A further object of the present invention is the provision of a device which includes a protective trough covering the inlet opening during initial lowering of the device into the reservoir.

A further object of the present invention is the provision of a device which is economical to manufacture, durable to use and efficient in operation.

SUMMARY OF THE INVENTION

The present invention utilizes a decanter which is designed to permit withdrawal of effluent fluid from a specific predetermined level beneath the surface of the fluid while at the same time preventing the intake of scum from the surface of the fluid or solids from the bottom of the reservoir.

The device includes a trough frame and a float frame which are vertically movably mounted with respect to one another. The float frame includes a fluid removal device having an inlet opening, and the trough frame includes a trough which fits in covering relation over the inlet opening of the fluid removal device. The float frame and the trough frame are movable with respect to one another from a sealed position wherein the trough is in sealed covering relation over the inlet opening of the fluid removal device to an open position wherein the trough is spaced away from the inlet opening of the fluid removal device.

The float frame is provided with styrofoam or other materials which enhance its buoyancy with respect to the fluid so that the float frame will float in the fluid at a predetermined point of equilibrium wherein the inlet opening of the fluid removal device is positioned in spaced relation below the upper surface of the fluid in the reservoir.

In operation, the float frame and the trough frame are suspended above the reservoir with the float frame and the trough frame in their sealed positions with respect to one another.

The two frames are then lowered into the fluid until the float frame achieves equilibrium in the fluid. At this point the float frame ceases descending with the trough frame, and the trough frame continues descending until it is moved to its open position, thereby exposing the inlet opening of the fluid removal device to the water in the reservoir.

The pump or fluid removal device is then actuated to draw water horizontally into the inlet opening and remove the fluid from the reservoir. As the level of the fluid in the reservoir drops, the float frame drops correspondingly, and a special float switch is adapted to sense when the float frame and the trough frame approach their sealed position. Prior to approaching this sealed position, the float switch causes the trough frame to be lowered an additional increment so that the fluid removal device can continue removing fluid from the reservoir.

When the reservoir has been lowered to a predetermined lower limit level, an additional switch is actuated to cause the float frame and the trough frame to be lifted to their original position above the fluid in the reservoir.

The trough permits the penetration of the device through a scum laden or crusted liquid surface, while at the same time preventing the scum from being drawn into the inlet opening of the fluid removal device. Furthermore, the horizontal intaking of fluid into the inlet opening prevents solids from being picked up from the bottom of the reservoir, or beneath the trough.

BRIEF DESCRIPTION OF THE FIGURES OF THE DRAWINGS

FIG. 1 is a perspective view of the present invention.

FIG. 2 is a sectional view taken along line 2—2 of FIG. 1.

FIG. 3 is a side elevational view of the device shown in FIG. 2.

FIG. 6 is a front elevational view such as shown in FIG. 5, but showing the device in its sealed position.

FIG. 7 is a partial enlarged detail perspective showing the mounting of the float frame roller wheels in the guide tracks.

FIG. 8 is a sectional view taken along line 8—8 of FIG. 5.

FIG. 9 is a detailed perspective view of the float switch used on the present device.

FIGS. 10A–10F show the relative positions of the device during use.

FIG. 11 is a schematic block diagram of the control system for controlling the pump and winch.

DETAILED DESCRIPTION OF THE PREFERRED EMBODIMENT

Figure 4:
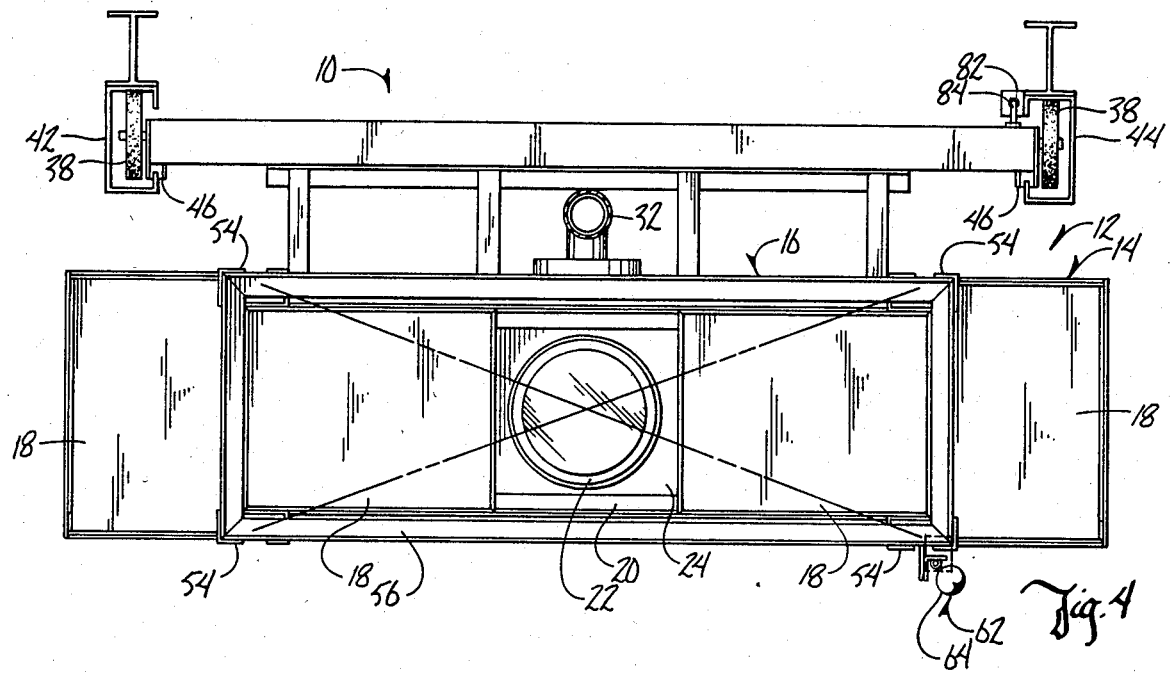
FIG. 4 is a top plan view of the device shown in FIG. 1.
Figure 5:
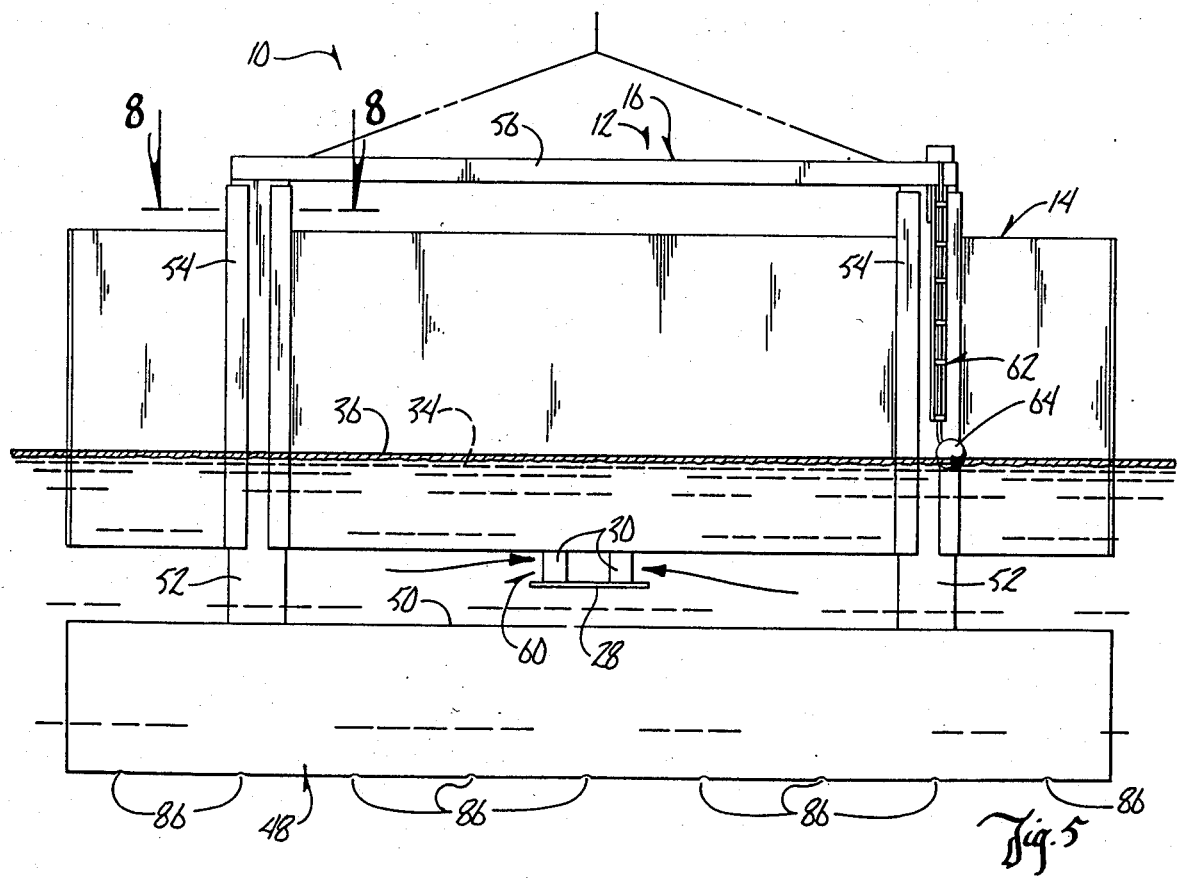
FIG. 5 is a front elevational view of the device shown in FIG. 2.

Referring to the drawings, the numeral 10 generally designates the device of the present invention. Device 10 comprises a frame assembly 12, having a float frame 14, and a trough frame 16.

Float frame 14 includes a plurality of styrofoam filled compartments 18 and a central pump compartment 20. Compartments 18 are each filled with a styrofoam or other float material 19 which imparts buoyancy to the device 14. Pump compartment 20 includes a pump 22 therein which is mounted on a bottom wall 24 of pump compartment 20. Bottom wall 24 is provided with a central opening 26 over which pump 20 is mounted. Extending below bottom wall 24 is a baffle plate 28 which is suspended in spaced relation below opening 26 by means of legs 30. Opening 26 and baffle plate 28 combine to provide a horizontal inlet opening for permitting fluid to enter opening 26 and be drawn into pump 22. Pump 22 is also connected to an outlet conduit 32 for carrying the waste water away as it is being pumped out by pump 22.

The buoyancy of float frame 14 is such that it will float within the reservoir in the position shown in FIG. 2, and in this position the baffle plate 28 and the central opening 26 are located well below the upper surface 34 as shown in FIG. 2 so that the scum or crust 36 formed thereon will be spaced above the inlet opening provided by baffle plate 28 and opening 26.

Float frame 14 includes a pair of rollers 38, 40 which are mounted within vertical guide tracks 42, 44, respectively. Guide tracks 42, 44 are stationarily mounted with respect to the reservoir.

As can be seen in FIG. 7, the guide tracks 42, 44 are C-shaped in cross-sectional configuration, and the roller bearings 38, 40 are retentively mounted for rolling movement within the C-shaped channels of tracks 42, 44. A glide bearing 46 facilitates further retentive engagement of the rollers 38, 40 in the guide tracks 42.

Trough frame 16 includes a V-shaped trough 48 which includes an open upper end 50 adapted to fit in sealing engagement over the inlet opening provided by baffle 28 and central opening 26 in the bottom of float frame 14. The sealed position of trough 48 is shown in FIGS. 3 and 6.

Four upwardly extending vertical members 52 extend upwardly from the four corners of trough 48 through corresponding C-shaped channels 54 of float frame 14. A rectangular frame 56 is attached to the upper ends of vertical members 52.

As can be seen in FIG. 8, the vertical members 52 are telescopically mounted within C-shaped channels 54 and a plurality of slide bearings 58 facilitate vertical sliding movement of vertical members 52 in C-shaped channels 54.

The two relative positions of the trough frame 16 and the float frame 14 are shown in FIGS. 2 and 3, respectively. In FIG. 3, the device is shown in its sealed position with trough 48 in sealed covering relation over the bottom of slide frame 14 so that it covers the baffle 28 and the opening 26, thereby preventing water from gaining access to baffle 28 or inlet 26.

The trough frame 16 is vertically slidable downwardly with respect to float frame 14 from the position shown in FIG. 3 to the position shown in FIG. 2. In this open position, the trough 48 is spaced below the baffle 28 of float frame 12, thereby permitting fluid to gain access horizontally through an inlet opening 60 formed in the space between baffle plate 28 and central opening 26. The inlet opening 60 permits water only to enter horizontally, thereby minimizing the chance that the scum 36 will be drawn into the inlet opening 60. This horizontal intake of inlet opening 60 also prevents the solids which may have settled to the bottom of the reservoir from being drawn into the pump.

Mounted to the trough frame 16 is a float switch 62 which comprises a ball float 64 (FIG. 9) having an upwardly extending stem 66 which is connected at its upper end to a block 68. Stem 66 is slidably mounted to an angle 70 which is attached to one of the vertical legs 52. This permits stem 66 to slide vertically with respect to trough frame 16.

A microswitch 72 is mounted on the top of leg 52 and is in the path of block 68 so that when block 68 moves downwardly and engages switch 72, it causes actuation of switch 72.

The operation of the device is shown in FIGS. 10A–10F. In FIG. 10A, the device is shown in its initial position. The entire frame 12 is suspended from a winch 74 above a reservoir 76 full of waste water having a crust or scum layer 36 on its upper surface, and having a plurality of solids 78 settled to the bottom.

A high level switch 80 is mounted at a predetermined height within reservoir 76 and is adapted to sense when the level of water within reservoir 76 reaches that predetermined level. At that point, switch 80 is actuated to cause winch 74 to lower the frame assembly 12 from the position shown in FIG. 10A to the position shown in FIG. 10B. In FIG. 10B, the device is shown with the float assembly 14 in its equilibrium position within the fluid water in reservoir 76. That is, the buoyancy of float frame 14 causes it to float in the position shown in FIG. 10B. It should be noted that the bottom of float frame 14 is positioned in spaced relation below the scum layer 36.

The winch 74 continues lowering trough frame 16 from the position shown in FIG. 10B, to the position shown in FIG. 10C. During this lowering movement, the buoyancy of float frame 14 prevents it from being any further lowered, and consequently the trough 48 moves downwardly, thereby exposing the inlet opening 60 to the intermediate layer of fluid within reservoir 76.

Also in the position shown in FIG. 10C, the float switch 62 has engaged the upper surface of the fluid within reservoir 26, thereby actuating pump 22 to commence the pumping action. Float switch 62 simultaneously causes deactuation of winch 74 to stop downward movement of trough frame 16. Fluid is drawn in horizontally to inlet opening 60 and is pumped outwardly through outlet conduit 32.

As fluid is pumped out of reservoir 26, the level of water within the reservoir drops from the position shown in FIG. 10C to the position shown in FIG. 10D. When the level drops sufficiently far to take float 62 out of engagement with the water, switch float 64 causes the pump to be turned off, and simultaneously causes the winch 74 to be reactuated to lower trough frame 16 from the position shown in FIG. 10D to the position shown in FIG. 10E. As the float 62 again engages the water, the pump is actuated and the winch is again deactuated.

A lower limit switch 82 is mounted on vertical guide tracks 42 and is adapted to be engaged by a trip arm 84 which is mounted to the float frame 14. As the water level within the reservoir progresses downwardly to the position shown in FIG. 10F, trip arm 84 engages lower limit switch 82, thereby signaling the winch 74 to reverse its direction and to lift the entire frame assembly 12 back to the position shown in FIG. 10A.

The limit switches 82, 78, 80, and 62 may be connected in any of a number of ways to cause the results described above. However, in FIG. 11, one method for using these switches is illustrated. Float switch 62 is connected to a pump relay and to a winch down relay. Float switch 62 is normally in a position which causes the pump to be deactuated and which causes the winch down relay to be actuated. When float switch 62 engages the water, it deactuates the winch down relay and also actuates the pump relay, thereby causing the pump to be actuated.

The upper limit switch 80 is connected to the down winch relay and is adapted to cause the winch to move downwardly whenever the fluid level within the reservoir 76 is sufficiently high to trigger switch 80.

The lower limit switch 82 is connected to an up relay which is in turn connected to the winch and is adapted to actuate the winch in an upward direction whenever switch 82 is tripped. Other variations of circuitry and switches can be utilized to produce the sequencing shown in FIGS. 10A through 10F.

Trough 48 is provided with a plurality of drain holes 86 which permit the water to drain from trough 48 whenever trough 48 is suspended above the reservoir.

The device of the present invention is particularly advantageous in preventing the solids at the bottom of the reservoir and the scum at the top surface of the reservoir from being drawn into the pump. The trough 48 spreads and breaks the crust or scum at the top of the reservoir and protects the pump inlet opening until the pump inlet opening has been lowered below the scum surface. Then the trough opens and permits horizontal entry of water from the intermediate layer of the reservoir. This intermediate layer is generally free from substantial solid materials, and therefore the tendency to clog the pump or damage the pump is minimized.

The present invention also permits adjustment of the positions of the float frame and the trough frame during the time that the fluid level is lowering within the reservoir. This adjustment continues until the fluid level reaches its lowest desired limit, at which time the device is lifted out of the reservoir and above the reservoir for storage until the level of the reservoir again reaches its full condition.

Thus, it can be seen that the invention accomplishes at least all of its stated objectives.

What is claimed is:

1. A method for removing fluid from a reservoir, said reservoir of fluid having an upper surface level, an intermediate level below said upper surface level, and a bottom level below said intermediate level, a crust of partially decayed waste being formed at said upper surface level and a plurality of waste solids being at said bottom level, said method comprising:

holding a frame assembly in an upper position above said fluid, said frame assembly comprising a float frame and a trough frame, said float frame having fluid removal means thereon with an inlet opening for taking in fluid in response to actuation of said fluid removal means, said trough frame having trough means thereon, said float frame being movably mounted relative to said trough frame for movement from a sealed position wherein said trough means is spaced below said inlet opening, said float frame having sufficient buoyancy to float at a predetermined equilibrium position in said fluid with said inlet opening submerged in said fluid to said intermediate level;

moving said frame assembly downwardly from said upper position with said trough frame and said float frame in said sealed position until said float frame is in said equilibrium position;

continuing to move said trough frame downwardly while said float frame remains in said equilibrium position whereby said trough frame will move to said open position relative to said float frame, thereby exposing said inlet opening to fluid from said intermediate level of said reservoir;

actuating said fluid removal means to cause fluid from said intermediate level to be drawn into said inlet opening and removed from said reservoir.

2. A method according to claim 1 and further comprising sensing when said float frame reaches said equilibrium position with a float switch which actuates said fluid removal means when said float frame reaches said equilibrium position.

3. A method according to claim 2 and further comprising lowering said float frame relative to said trough frame during the removal of fluid from said reservoir so that said float frame will remain in said equilibrium position relative to said upper surface level of said fluid during the lowering of said upper surface of said fluid in response to said removal.

4. A method according to claim 3 and further comprising sensing when said float frame reaches a predetermined lower limit position relative to said reservoir, and lifting said frame assembly to said upper position when said float frame reaches said lower limit position.

5. A method according to claim 4 and further comprising turning off said fluid removal means and returning said trough frame to said sealed position prior to lifting said float frame to said upper position.

6. A device for removing fluid from below the upper surface of a reservoir of said fluid, said device comprising:

a trough frame having a trough means thereon, said trough frame being adapted to be connected to lifting means for lifting said trough frame from an upper position wherein said trough means is above said upper surface of said reservoir to a lower position wherein said trough means is submerged below said upper surface of said reservoir;

a float frame having fluid removal means thereon and a horizontally disposed inlet opening for taking in said fluid horizontally in response to actuation of said fluid removal means, said float frame having sufficient buoyancy to float at a predetermined level in said reservoir with said inlet opening spaced below said upper surface of said reservoir;

said float frame being movably mounted to said trough frame for vertical movement relative thereto from a sealed position wherein said trough means is in sealed covering relation over said inlet opening of said fluid removal means so as to prevent said fluid from entering said inlet opening to an open position wherein said float frame and said inlet opening are spaced upwardly from said trough means whereby said inlet opening is exposed to said fluid;

the buoyancy of said float frame causing said float frame to move from said sealed position to said open position during movement of said trough frame from said upper position to said lower position.

7. A device for removing fluid from below the upper surface of a reservoir of said fluid, said device comprising:

a frame assembly comprising a trough frame and a float frame, said float frame having fluid removal means thereon and an inlet opening for taking in fluid in response to actuation of said fluid removal means, said trough frame having trough means thereon, said float frame being movably mounted to said trough frame for movement from a sealed position wherein said trough means is below and in sealed covering relation over said inlet opening to prevent access of said fluid to said inlet opening to an open position wherein said trough means is spaced below said inlet opening so as to permit access of said fluid to said inlet opening;

said float frame having sufficient buoyancy to float at a predetermined level in said fluid with said inlet opening spaced below said upper surface of said reservoir;

lifting means connected to said frame assembly for moving said frame assembly from an upper position wherein said float frame is in said sealed position and said trough means is above said upper surface of said fluid, to a float position wherein said float frame is at said predetermined level in said fluid and is in said sealed position with respect to said trough means, to a lower position wherein said float frame is at said predetermined level in said fluid and said trough means has moved downwardly to said open position relative to said float frame, said buoyancy of said float frame preventing continued downward movement of said float frame below said float position.

8. A device according to claim 7 wherein guide means are mounted adjacent said reservoir, guide follower means being attached to said float frame and being retentively movably mounted to said guide means for following said guide means during movement of said float frame from said upper to said float positions.

9. A device according to claim 7 wherein said float frame comprises a plurality of vertical float frame members, said trough frame comprising a plurality of vertical trough frame members, each of which is telescopically mounted to one of said vertical float frame members for vertical telescoping movement therewith.

10. A device according to claim 1 comprising a float switch means connected to said trough means for sensing the level of said upper surface of said fluid relative to said trough means, said float switch means being connected to said lifting means for causing lowering of said trough means in response to lowering of said upper surface of said fluid below a predetermined level with respect to said trough means when said trough frame is in said lower position.

11. A device according to claim 10 comprising limit switch means for sensing movement of said float frame to a lower limit position relative to said reservoir, said limit switch causing actuation of said lifting means in response to movement of said float frame to said lower limit position for causing said lifting means to lift said frame assembly to said upper position.

12. A device according to claim 7 wherein said float frame comprises a container having a bottom wall and a plurality of side walls, defining a chamber therein, said inlet opening being provided in said bottom wall.

13. A device according to claim 12 wherein said trough means includes side walls having upper perimetric edges defining an upwardly presented opening, said upper perimetric edges surrounding said inlet opening and being in sealing engagement with said bottom wall of said float frame whenever said float frame and said trough frame are in said sealed position and being spaced below said bottom wall of said float frame when said float frame and said trough frame are in said open position.

14. A device according to claim 13 wherein said trough means comprises a V-shaped bottom wall.

* * * * *